No. 761,446. PATENTED MAY 31, 1904.
N. F. CANEPA.
INFLATING PUMP FOR PNEUMATIC TIRES.
APPLICATION FILED MAY 28, 1903.
NO MODEL.

Witnesses
Alfred A Eicker
Edw. Harrington

Inventor
Nicholas F. Canepa
by Higdon & Longan & Hopkins, Attys

THE NORRIS PETERS CO., PHOTO-LITHO., WASHINGTON, D. C.

No. 761,446. Patented May 31, 1904.

UNITED STATES PATENT OFFICE.

NICHOLAS F. CANEPA, OF ST. LOUIS, MISSOURI.

INFLATING-PUMP FOR PNEUMATIC TIRES.

SPECIFICATION forming part of Letters Patent No. 761,446, dated May 31, 1904.

Application filed May 28, 1903. Serial No. 159,081. (No model.)

*To all whom it may concern:*

Be it known that I, NICHOLAS F. CANEPA, a citizen of the United States, residing at St. Louis, State of Missouri, have invented certain new and useful Improvements in Inflating-Pumps for Pneumatic Tires, of which the following is a specification containing a full, clear, and exact description, reference being had to the accompanying drawings, forming a part hereof.

My invention relates to an improved inflating-pump for pneumatic tires, and has for its object to provide a pump adapted to be mounted upon a wheel and to be actuated by the revolution of the wheel upon which it is mounted and whose tire it is intended to inflate.

Figure 1:
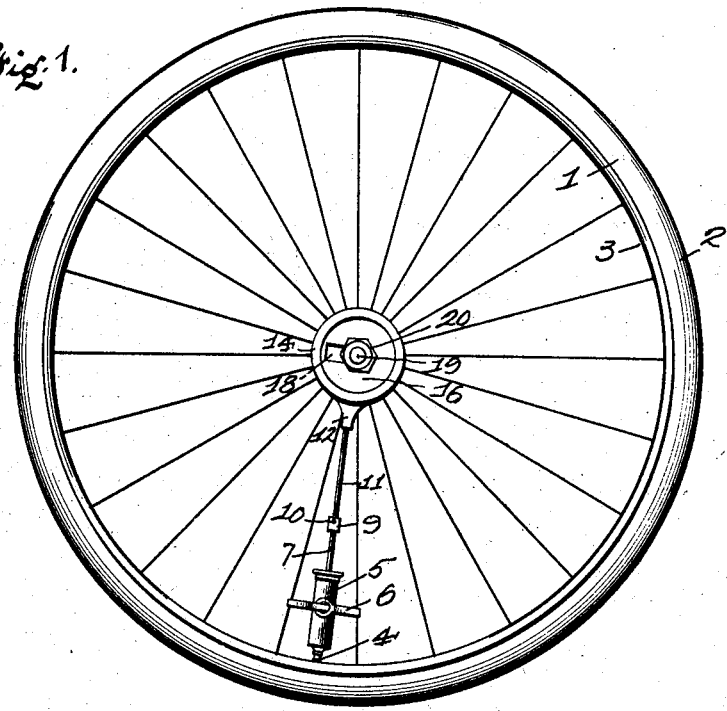
Figure 2:
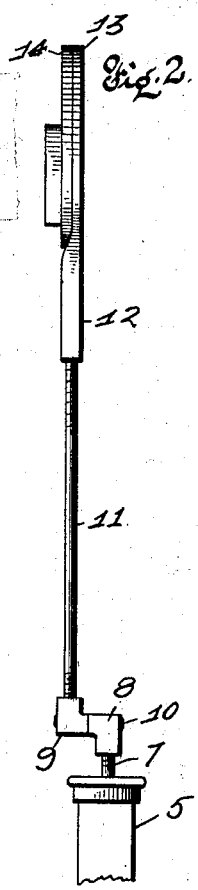
Figure 3:
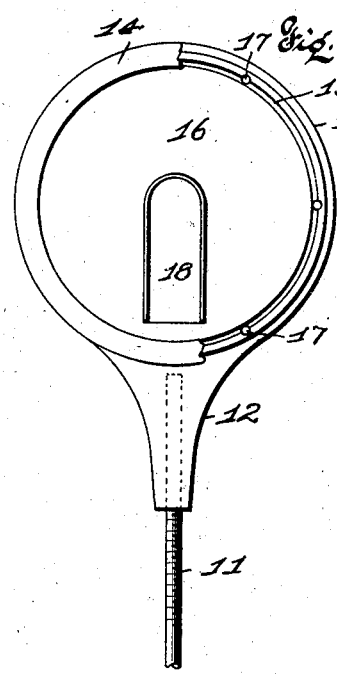
Figure 4:
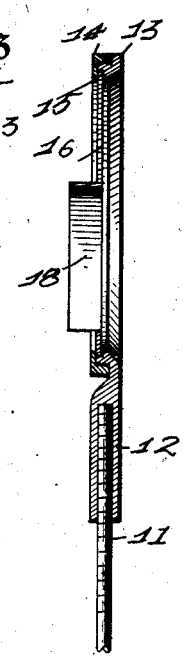

In the drawings, which form a part of this specification, Figure 1 is a side view of the wheel equipped with the device embodying my invention. Fig. 2 is a side view of the mechanism by which the pump is operated. Fig. 3 is a front view of the eccentric whereby the pump is actuated, showing a part broken away to disclose the ball-bearings employed. Fig. 4 is a vertical transverse midsection of the eccentric mechanism.

In the drawings the wheel 1 is provided with the pneumatic tire 2, mounted upon the felly 3 and having the valve 4 extending inwardly through the felly in the usual manner.

The pump 5 is mounted upon the valve 4 and connected to the adjacent spokes by means of the brackets 6.

The pump-rod 7 is provided with the bearing 8, which is connected to the bearing 9 by means of the pin 10.

The driving-rod 11 is mounted in the bearing 9 at its outer end and at its inner end is screwed into the lug 12, which extends outwardly from and is preferably made integral with the eccentric ring 13. The eccentric ring is provided with the collar 14, forming the groove 15 to receive the plate 16. The groove 15 is provided with ball-bearings 17. The plate 16 is provided with the slot 18, which is adapted to fit about the axle 19 and be held in place thereon by means of the nut 20.

When the pump is not in action, the plate 16 and its connections are mounted as shown in Fig. 1, so that the eccentric ring 13 is concentric with the wheel 1.

When it is desired to inflate the tire, the plate 16 is moved by loosening the nut 20 and tightening the nut 20 when the plate 16 is sufficiently eccentric. The revolution of the wheel 1 will then cause the pump 5 to operate and inflate the tire 2.

Having thus described my invention, what I claim as new, and desire to have secured to me by the grant of Letters Patent, is—

An inflating-pump mechanism for pneumatic tires, comprising the combination with an axle and wheel, having a felly and pneumatic tire, and a valve extending from the tire through the felly; of a pump mounted upon the valve and connected to the spokes of the wheel; the bearing 8 connected to the pump-rod; the bearing 9 pivoted to the bearing 8 by the pin 10; the driving-rod 11 connected to the bearing 9; the plate 16 having the slot 18 in which the axle is adjustably mounted by means of the nut 20; the eccentric ring 13; the collar 14 screw-seated on the ring and forming a groove or bearing in which the plate 16 is rotatably mounted on the bearings 17; the lug 12 extending from the ring 13 to receive the rod 11, substantially as specified.

In testimony whereof I have signed my name to this specification in presence of two subscribing witnesses.

NICHOLAS F. CANEPA.

Witnesses:
 ALFRED A. EICKS,
 M. G. IRION.